(12) United States Patent
Lai (10) Patent No.: US 10,921,504 B1
(45) Date of Patent: Feb. 16, 2021

(54) LIGHT GUIDE STRUCTURE AND LUMINOUS PAD HAVING THE SAME

(71) Applicant: E-CENTURY TECHNICAL & INDUSTRIAL CORPORATION, New Taipei (TW)

(72) Inventor: I-Kuang Lai, New Taipei (TW)

(73) Assignee: E-CENTURY TECHNICAL & INDUSTRIAL CORPORATION, New Taipei (TW)

( * ) Notice: Subject to any disclaimer, the term of this patent is extended or adjusted under 35 U.S.C. 154(b) by 0 days.

(21) Appl. No.: 16/796,007

(22) Filed: Feb. 20, 2020

(51) Int. Cl.
*F21V 8/00* (2006.01)
*F21V 23/00* (2015.01)

(52) U.S. Cl.
CPC ............ *G02B 6/001* (2013.01); *F21V 23/001* (2013.01)

(58) Field of Classification Search
CPC .. G02B 6/001; G02B 6/0081; G02B 6/00093; G02B 6/02; F21V 23/001
See application file for complete search history.

(56) References Cited

U.S. PATENT DOCUMENTS

| 8,167,471 B1 * | 5/2012 | Moritz | H01B 7/366 |
| | | | 362/582 |
| 10,178,887 B1 * | 1/2019 | Chen | A41G 1/005 |
| 2005/0089284 A1 * | 4/2005 | Ma | G02B 6/001 |
| | | | 385/101 |
| 2006/0109680 A1 * | 5/2006 | Peng | G02B 6/0008 |
| | | | 362/565 |
| 2007/0279929 A1 * | 12/2007 | Peng | D03D 15/00 |
| | | | 362/556 |
| 2007/0281155 A1 * | 12/2007 | Tao | A47G 27/0243 |
| | | | 428/365 |
| 2011/0103757 A1 * | 5/2011 | Alkemper | C03B 37/01211 |
| | | | 385/124 |
| 2014/0049168 A1 * | 2/2014 | Chen | F21S 4/10 |
| | | | 315/161 |
| 2015/0277015 A1 * | 10/2015 | Lu | G02B 6/0008 |
| | | | 362/582 |

* cited by examiner

*Primary Examiner* — Anabel Ton
(74) *Attorney, Agent, or Firm* — Chun-Ming Shih; HDLS IPR Services (57) ABSTRACT

Disclosed are a light guide structure and a luminous pad with the structure. The luminous pad includes a pad body and a light guide structure installed at the periphery of the pad body. The light guide structure includes a light guide strip, a light source module, an electric object, a light pipe and a transmission wire set. The light guide strip has first and second positions; the light source module is installed at the first position and electrically connected to the transmitter; the electric object is installed at the second position; the light pipe is sheathed on light guide strip; the transmission wire set is installed between the light guide strip and the light pipe, and the transmission wire set is connected between the electric object and the transmitter. Therefore, the transmission wire set can be hidden to maintain aesthetics and ensure the flatness of the luminous pad.

19 Claims, 7 Drawing Sheets

LIGHT GUIDE STRUCTURE AND LUMINOUS PAD HAVING THE SAME

BACKGROUND OF THE INVENTION

1. Technical Field

The technical field relates to a light guide strip, and more particularly to a light guide structure with a transmission wire, and a luminous pad having the structure.

2. Description of Related Art

One of the reasons for the light guide strip to have additional wiring resides on the requirement of adding an electric object in additional to the original light source, and another reason resides on the increase of the light guide distance as described below.

For the first reason, it is necessary to install an external electric wire between the electric object and a power supply after the electric object is added.

For the second reason, if the light guide distance of the light guide strip used in the luminous pad or wound around the periphery of the luminous pad increases, the light emitted from the original single light source will be unable to pass through the whole light guide strip, so that the light guide strip will produce a dark area where the light cannot be guided, and the luminous effect will be affected adversely. The discloser of this disclosure adds another light source provided to project another light to the dark area in order to eliminate the dark area. However, a new problem arises. If the power supply connected to the original light source also supplies power to the other light source, it will require the connection of an external electric wire additionally.

In other words, regardless of which of the aforementioned methods is used, it is necessary to connect an external electric wire additionally. After the additional external electric wire is connected, the existence of the external electric wire will affect the flatness and smoothness of the luminous pad.

In view of the aforementioned drawback of the prior art, the discloser of this disclosure based on years of experience in the related industry to conduct extensive research and experiment, and finally provided a feasible solution as disclosed in this disclosure to overcome the drawback of the prior art.

SUMMARY OF THE INVENTION

Therefore, it is a primary object of this disclosure to provide a light guide structure and a luminous pad with the structure, wherein a transmission wire set is coupled between an electric object and a transmitter along the lengthwise direction of a light guide strip by an inside wiring or outside winding method.

To achieve the aforementioned and other objectives, this disclosure discloses a light guide structure, coupled to a transmitter, and comprising: a light guide strip, having a first position and a second position defined thereon, a light source module, installed at the first position and coupled to the transmitter; an electric object, installed at the second position; a light pipe, sheathed on the light guide strip; and a transmission wire set, installed between the light pipe and light guide body whose inner and outer sides are configured to be opposite to each other, and the transmission wire set being coupled and electrically conducted between the electric object and the transmitter.

This disclosure further provides a luminous pad with the light guide structure, coupled to a transmitter, and comprising: a pad body; and a light guide structure configured to be corresponsive to the periphery of the pad body. The light guide structure further comprises: a light guide strip, having a first position and a second position defined thereon; a light source module, installed at the first position and coupled to the transmitter; an electric object, installed at the second position; a light pipe, sheathed on the light guide strip; and a transmission wire set, installed between the light pipe and light guide body whose inner and outer sides are configured to be opposite to each other, and the transmission wire set being coupled and electrically conducted between the electric object and the transmitter.

Compared with the prior art, the first type of the luminous pad of this disclosure has the effect of connecting the transmission wire set between the electric object and the transmitter by the inside wiring method in order to hide the transmission wire set, maintain aesthetics, and ensure the flatness and smoothness of the luminous pad.

This disclosure further provides another luminous pad with the light guide structure coupled to a transmitter and comprising: a pad body; and a light guide structure, configured to be corresponsive to the pad body periphery. The light guide structure further comprises: a light guide strip, fixed to the periphery of the pad body and having a first position and a second position defined thereon, and the light guide strip comprises a light guide body and a light pipe wound around the light guide body; a light source module, installed at the first position and coupled to the transmitter; an electric object, installed at the second position; and a transmission wire set, wound around an outer wall of the light pipe from the exterior of the light guide strip, and coupled and electrically conducted between the electric object and the transmitter.

Compared with the prior art, the second type of the luminous pad of this disclosure has the effect of connecting the transmission wire set between the electric object and the transmitter by the outside winding method in order to hide the transmission wire set, maintain aesthetics, and ensure the flatness and smoothness of the luminous pad.

DESCRIPTION OF THE PREFERRED EMBODIMENTS

The technical contents of this disclosure will become apparent with the detailed description of preferred embodiments accompanied with the illustration of related drawings as follows. It is intended that the embodiments and drawings disclosed herein are to be considered illustrative rather than restrictive.

Figure 4:
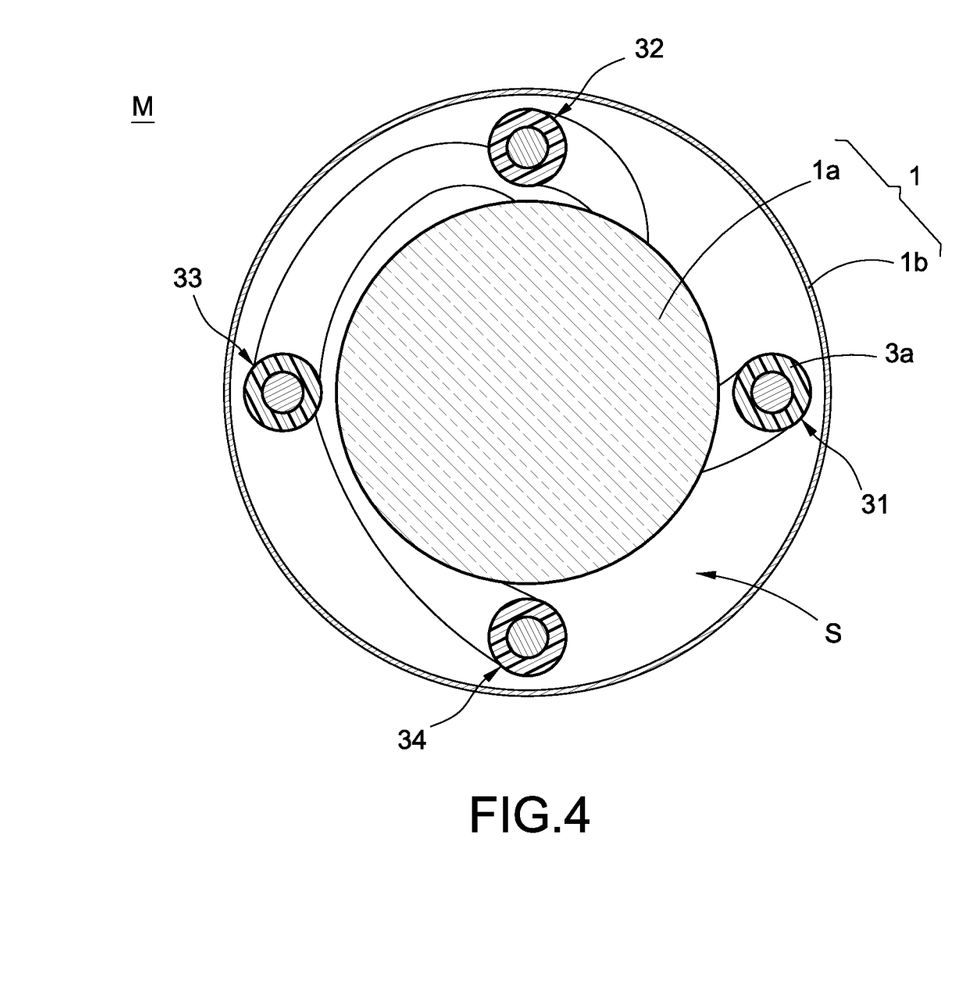
FIG. 4 is a cross-sectional view of this disclosure as depicted in FIG. 3.
Figure 5:
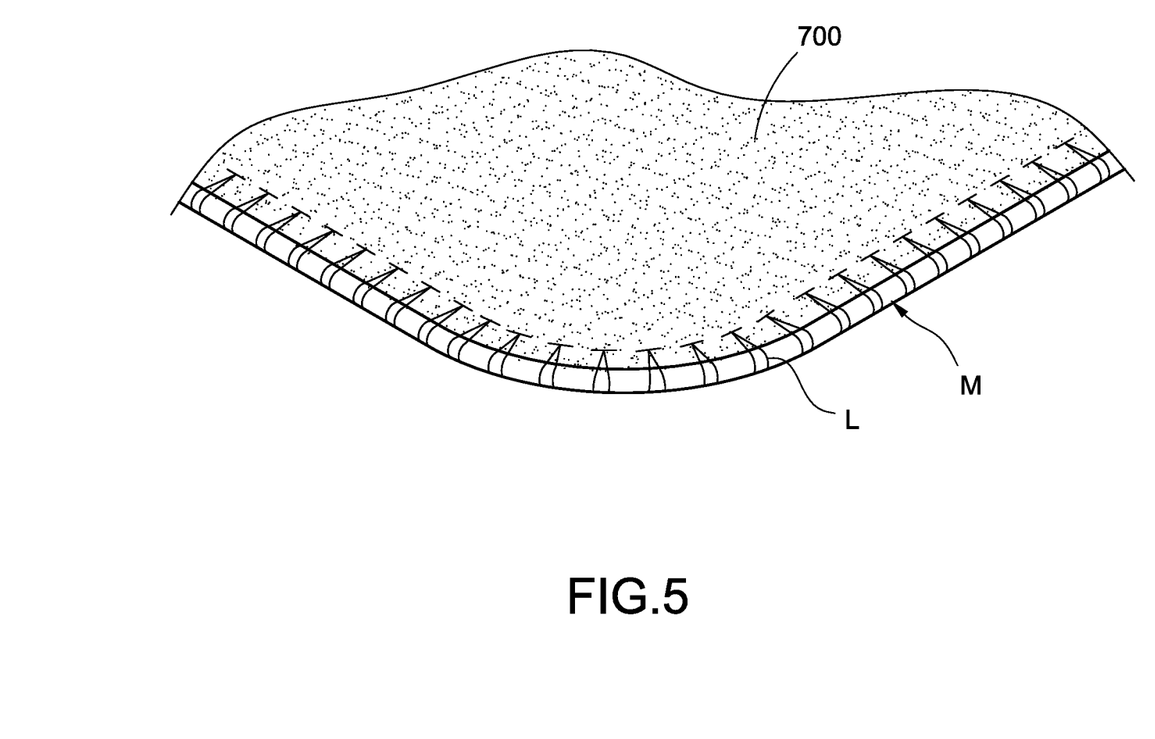
FIG. 5 is a partial perspective view of the luminous pad in accordance with the first embodiment of this disclosure.
Figure 6:
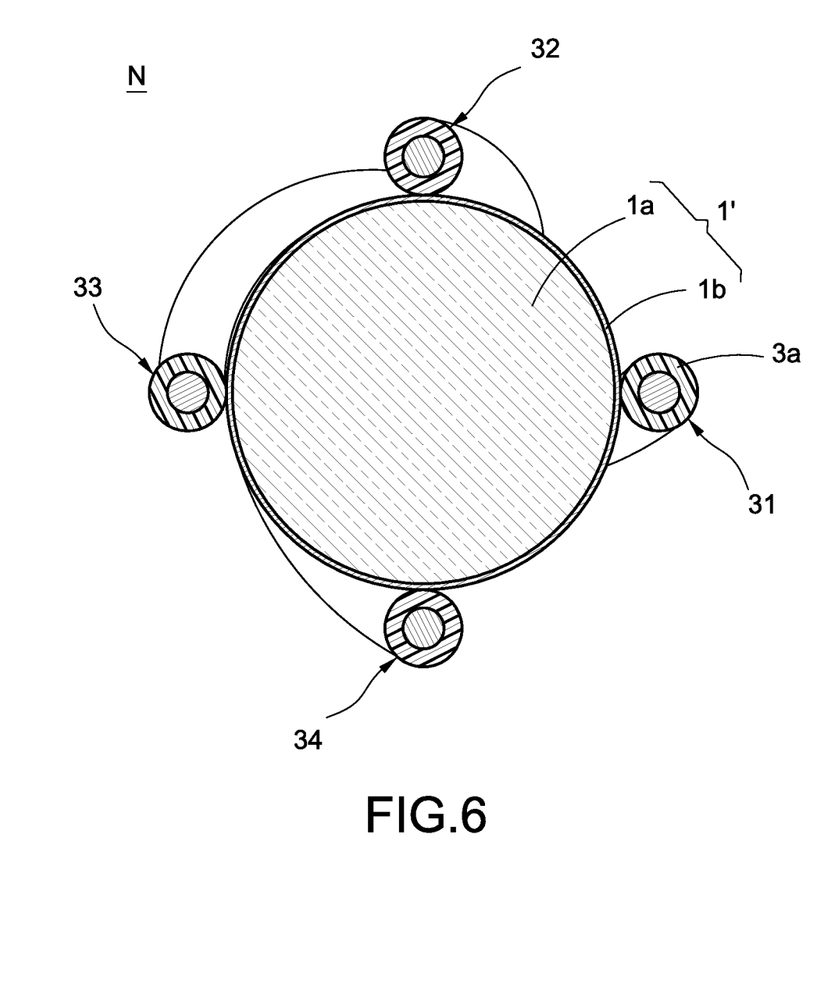
FIG. 6 is a cross-sectional view of a light guide strip assembly in a luminous pad in accordance with a second embodiment of this disclosure.
Figure 7:
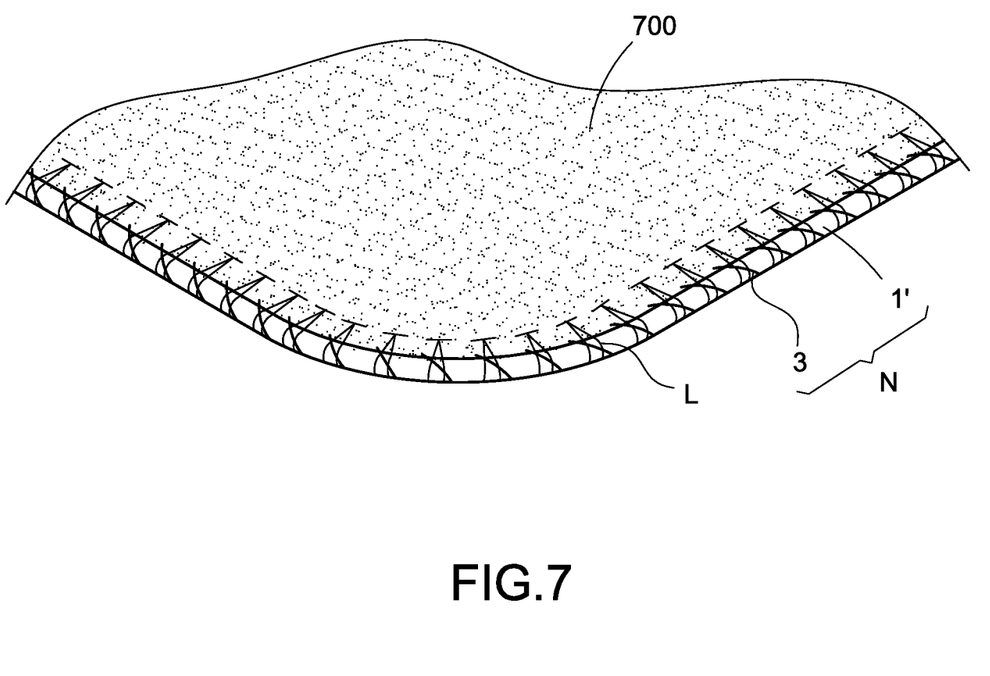
FIG. 7 is a partial perspective view of the luminous pad in accordance with the second embodiment of this disclosure.

With reference to FIGS. 1 to 5 for a light guide structure and a luminous pad with the structure in accordance with a first embodiment of this disclosure, and FIGS. 6 and 7 for a luminous pad in accordance with a second embodiment of this disclosure respectively, the luminous pad comprises a light guide structure 100 and a pad body 700, and the light guide structure 100 is installed to the periphery 7 of the pad body 700 by different feasible methods.

In the first embodiment of this disclosure as shown in FIGS. 1 to 4, the light guide structure 100 is coupled to a transmitter P (capable of transmitting electric power and/or signals), for transmitting electric power and/or signals to the light guide structure 100. The light guide structure 100 comprises: a light guide strip 1, a transmission wire set 3, a light source module 4 and an electric object 5. Wherein, the transmitter P can be a power supply or a controller, and this disclosure is not limited thereto.

Figure 1:
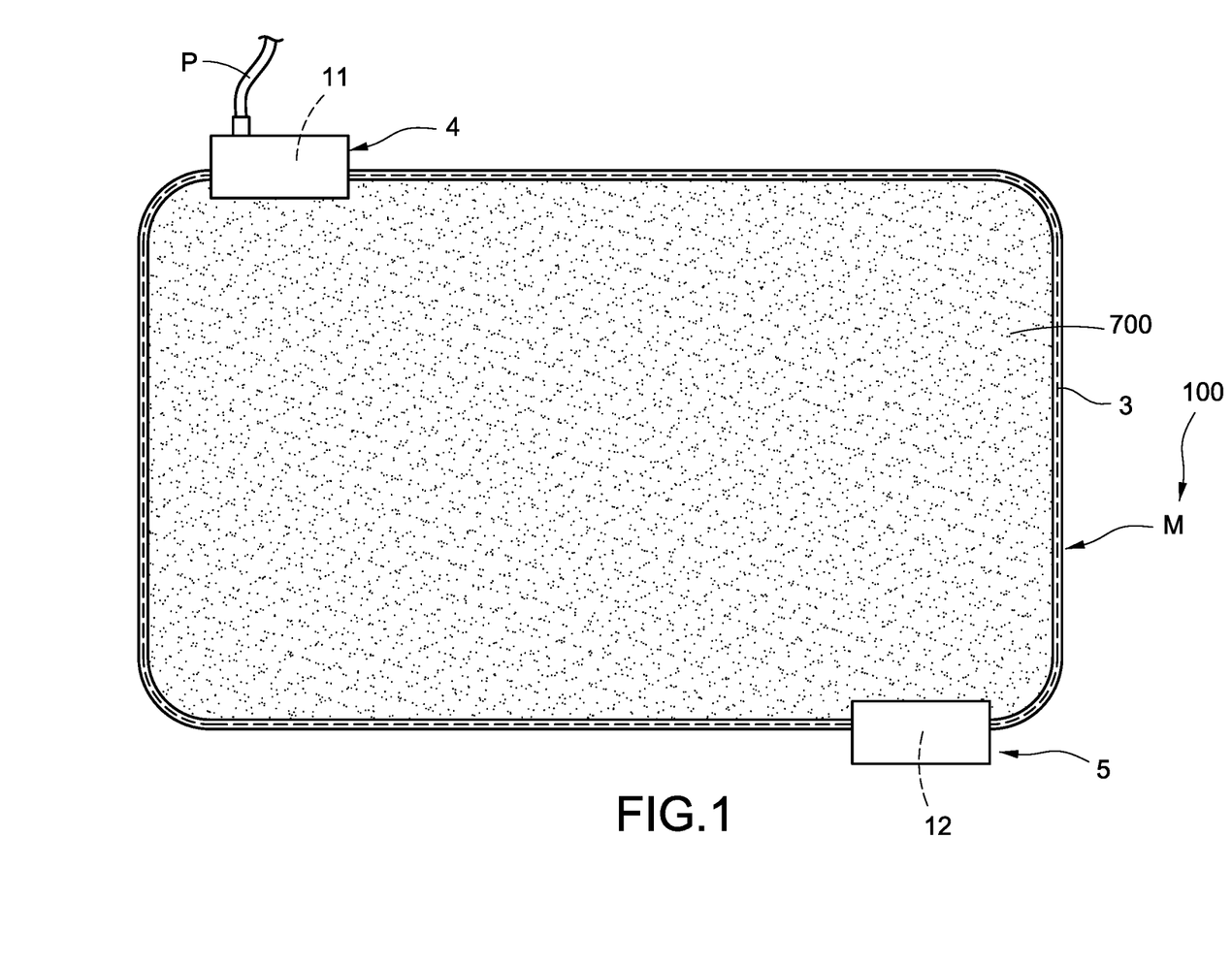
FIG. 1 is a top view of a luminous pad in accordance with a first embodiment of this disclosure.
Figure 3:
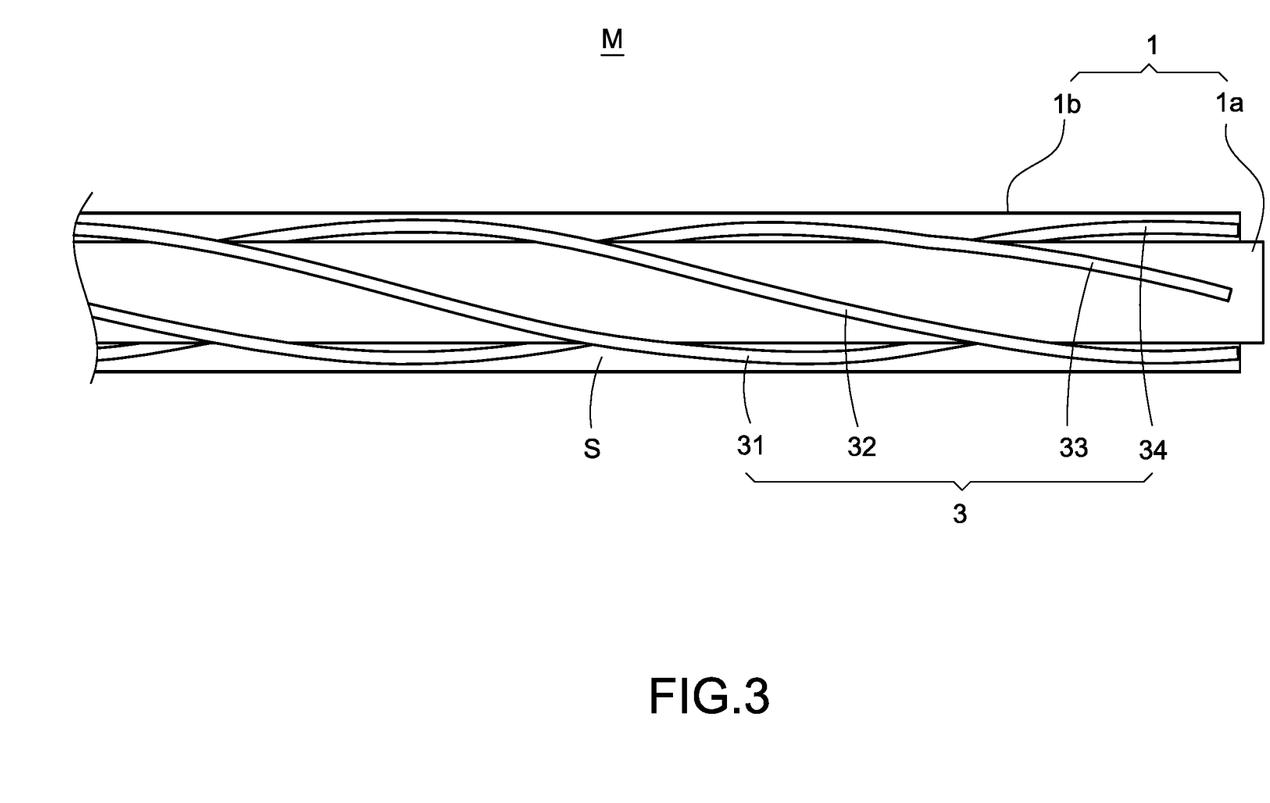
FIG. 3 is a side view of a light guide strip assembly in the luminous pad in accordance with the first embodiment of this disclosure.

The light guide strip 1 can be an optical fiber cable, but this disclosure is not limited thereto. The light guide strip 1 has a first position 11 and a second position 12 defined thereon, and the first position 11 and the second position 12 are away from each other (as shown in FIG. 1), or near each other (not shown in the figure), and this disclosure is not limited thereto. In this embodiment, the first position 11 is near the transmitter P, and the second position 12 is away from the transmitter P. In FIGS. 3 and 4, the light guide strip 1 comprises a light guide body 1a and a light pipe 1b sheathed on the light guide body 1a; wherein the light pipe 1b is a light pipe made of a Teflon material, and the light pipe 1b comes with at least one color but still can transmit light.

The light source module 4 is installed at the first position 11, and the electric object 5 is installed at the second position 12. The light source module 4 may be any module capable of emitting light, and the light of the light source module 4 can be projected into the light guide strip 1 and guided; and the electric object 5 can be any object consuming electric power. In this embodiment, the electric object 5 is another light source module. The light source module 4 is electrically coupled to the transmitter P, so that the transmitter P can transmit electric power and/or signals to an adjacent light source module 4.

The transmission wire set 3 is installed between the light pipe 1b and the light guide body 1a, whose inner and outer sides are configured to be opposite to each other. In a preferred embodiment, the transmission wire set 3 is positioned by being sparsely attached to or wound around an outer wall of the light guide body 1a. In this embodiment, the winding method is used for the illustration of this disclosure. The transmission wire set 3 can be coupled and electrically conducted between the electric object 5 and the transmitter P, so that the transmitter P can transmit electric power and/or signals to the electric object 3 at a remote end through the transmission wire set 3. It is noteworthy that the transmission wire set 3 is installed between the light pipe 1b and the light guide body 1a, so that the transmission wire set 3 can be hidden in the light pipe 1b to maintain aesthetics and achieve the inside wiring effect. In short, this disclosure uses the inside wiring method to hide the transmission wire set 3 between the light guide body 1a and the light pipe 1b, and transmission wire set 3 can be coupled and electrically conducted between the electric object 5 and the transmitter P along the lengthwise direction of the light guide strip 1 as shown in FIG. 1.

The transmission wire set 3 comprises an external transmission wire or at least two external transmission wires spaced from each other. In this embodiment, four external transmission wires 31, 32, 33, 34 are used for illustrating this disclosure, and any two adjacent transmission wires are spaced from each other, so that the four external transmission wires 31. 32, 33, 34 are sparsely attached to or wound around the outer wall of the light guide body 1a. In FIG. 4, the external transmission wire is a transmission wire with an insulated outer layer 3a, and this embodiment uses a twisted wire with an insulated outer layer 3a as an example for illustrating this disclosure.

It is noteworthy that when the transmission wire set 3 includes one external transmission wire, this external transmission wire can be a conductive wire or a signal wire; when the transmission wire set 3 includes a plurality of external transmission wires, these external transmission wires can be a plurality of conductive wires, or a plurality of signal wires, or at least one conductive wire and at least one signal wire. In addition, the light guide strip 1 and the transmission wire set 3 can be combined into a light guide strip assembly M as shown in FIG. 3.

In FIGS. 3 and 4, a wire accommodation space S is defined between the light guide body 1a and the light pipe 1b, and the transmission wire set 3 is disposed in the wire accommodation space S. Wherein, the wire accommodation space S can be any space capable of accommodating the transmission wire set 3 such as the partition between the exterior and interior of the light guide body 1a and the light pipe 1b (as shown in FIG. 4) or four wiring channels (not shown in the figure) provided for passing the four external transmission wires 31, 32, 33, 34 respectively, but this disclosure is not limited thereto.

In FIG. 1, the light source module 4 and the electric object 5 of this disclosure are installed at the first position 11 and the second position 12 of the light guide strip 1 respectively. In a preferred embodiment, they are installed at two relative positions of the light guide strip 1 respectively, so that each individual light guide distance becomes half of the original total light guide distance, and the area that guided light fails to reach no longer exists, and the dark area of the light guide strip 1 no longer exists.

In addition, the light pipe 1b comes with at least one color but still can transmit light, so that the light source module 4 and/or the electric object 5 of another light source module can use a light source which is not necessary the colored light source.

Figure 2:
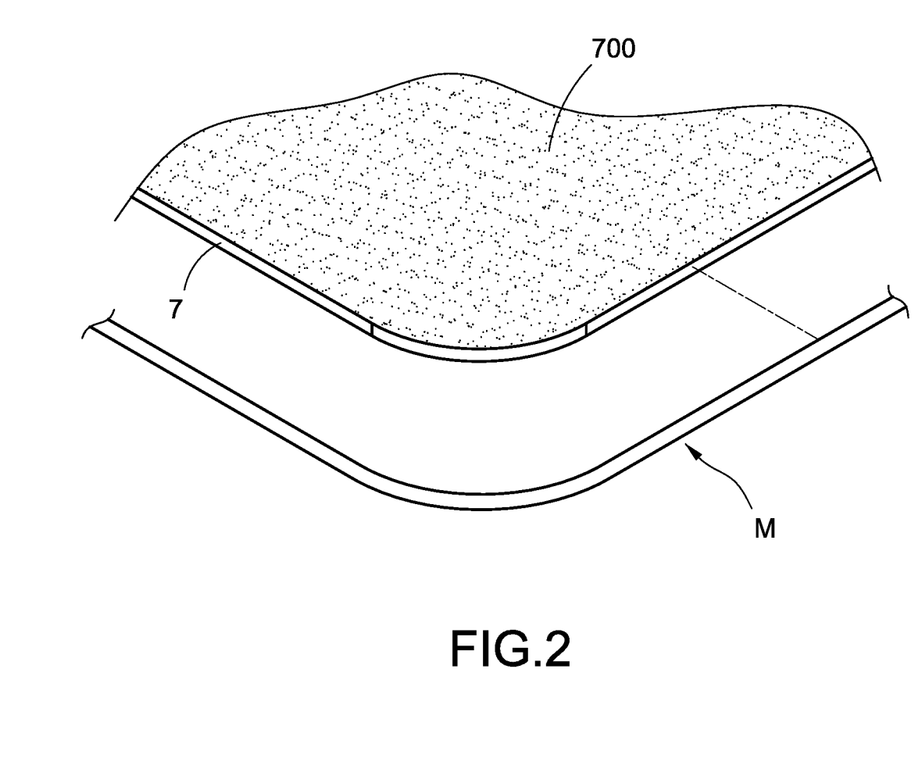
FIG. 2 is a partial exploded view of the luminous pad in accordance with the first embodiment of this disclosure.

In the luminous pad of this disclosure as shown in FIGS. 2 and 5, the light guide strip assembly M is installed at the periphery 7 of the pad body 700 by sewing (as shown in the figures) or adhesion (not shown in the figures), but this disclosure is not limited thereto. In the sewing method, the light guide strip assembly M is sewed to the periphery 7 of the pad body 700 with a suture. The light source module 4 and the electric object 5 can be adhered with each other and clamped between the top and bottom of the periphery 7 of the pad body 700.

In the second embodiment of this disclosure as shown in FIGS. 6 and 7, the second embodiment is substantially the same as the first embodiment except the configuration of the transmission wire set 3 of the second embodiment is different from that of the first embodiment.

In the second embodiment, the light guide strip 1' is fixed to the periphery 7 of the pad body 700, and the light guide strip 1' comprises a light guide body 1a and a light pipe 1b wound around an outer wall of the light guide body 1a. The transmission wire set 3 is wound around the outer wall of the light pipe 1b from the exterior of the light guide strip 1'. The light guide strip 1' and the transmission wire set 3 jointly form the light guide strip assembly N of the second embodiment.

In the method of fixing the light guide strip assembly N to the periphery 7 of the pad body 700, the light guide strip assembly N (including the light guide strip 1' and the transmission wire set 3a wound around the light guide strip 1') is sewed to the periphery 7 of the pad body 700 through a suture L by an overlock method.

Compared with the prior art, this disclosure has the following effects. In the first embodiment, the transmission wire set 3 is installed between the light guide body 1a and the light pipe 1b which are configured to the opposite to the outer and inner sides of the light guide strip 1, so that the transmission wire set 3 can be coupled and electrically conducted between the electric object 5 and the transmitter P by the inside wiring method, so that the transmission wire set 3 will not be exposed (since it is hidden between the light guide body 1a and the light pipe 1b) to maintain aesthetics and the transmission wire set 3 needs not to be exposed from the bottom of the luminous pad or clamped between two adjacent structural layers of the luminous pad to ensure the flatness and smoothness of the luminous pad. In the second embodiment, the transmission wire set 3 is coupled and electrically conducted between the electric object 5 and the transmitter P by the outside winding method, so that the transmission wire set 3 will not be exposed from the bottom of the luminous pad or included between two structural layers of the luminous pad to ensure the flatness and smoothness of the luminous pad.

While this disclosure has been described by means of specific embodiments, numerous modifications and variations could be made thereto by those skilled in the art without departing from the scope and spirit of this disclosure set forth in the claims.

What is claimed is:

1. A light guide structure, coupled to a transmitter, and comprising:
   a light guide strip, having a first position and a second position defined thereon, and the light guide strip comprising a light guide body and a light pipe sheathed on the light guide body;
   a light source module, installed at the first position and coupled to the transmitter;
   an electric object, installed at the second position; and
   a transmission wire set, installed between the light pipe and light guide body whose inner and outer sides are configured to be opposite to each other, and the transmission wire set being coupled and electrically conducted between the electric object and the transmitter.

2. The light guide structure as claimed in claim 1, further comprising a wire accommodation space defined between the relative inner and outer sides of the light guide body and the light pipe, and the transmission wire set is disposed in the wire accommodation space.

3. The light guide structure as claimed in claim 1, wherein the transmission wire set is wound around an outer wall of the light guide body.

4. The light guide structure as claimed in claim 1, wherein the transmission wire set comprises an external transmission wire or at least two external transmission wires spaced from each other.

5. The light guide structure as claimed in claim 4, wherein the external transmission wire or the at least two external transmission wires are wound around an outer wall of the light guide body.

6. The light guide structure as claimed in claim 1, wherein the transmission wire set comprises a conductive wire, a signal wire, a plurality of conductive wires, and a plurality of signal wires or comprises at least one conductive wire and at least one signal wire.

7. The light guide structure as claimed in claim 6, wherein the conductive wire is a twisted wire with an insulated outer layer.

8. The light guide structure as claimed in claim 1, wherein the light pipe is a light pipe made of a Teflon material, and the light pipe comes with a color but still can transmit light.

9. A luminous pad with a light guide structure, coupled to a transmitter, and comprising:
   a pad body; and
   a light guide structure, configured to surround a periphery of the pad body, and further comprising:
      a light guide strip, having a first position and a second position defined thereon, and the light guide strip comprising a light guide body and a light pipe sheathed on the light guide body;
      a light source module, installed at the first position and coupled to the transmitter;
      an electric object, installed at the second position; and
      a transmission wire set, installed between the light pipe and light guide body whose inner and outer sides are configured to be opposite to each other, and the transmission wire set being coupled and electrically conducted between the electric object and the transmitter.

10. The luminous pad with a light guide structure as claimed in claim 9, further comprising a wire accommodation space defined between the relative inner and outer sides of the light guide body and the light pipe, and the transmission wire set being disposed in the wire accommodation space.

11. The luminous pad with a light guide structure as claimed in claim 9, wherein the transmission wire set is wound around an outer wall of the light guide body.

12. The luminous pad with a light guide structure as claimed in claim 9, wherein the transmission wire set comprises an external transmission wire or at least two external transmission wires spaced from each other.

13. The luminous pad with a light guide structure as claimed in claim 12, wherein the external transmission wire or the at least two external transmission wires are wound around an outer wall of the light guide body.

14. The luminous pad with a light guide structure as claimed in claim 9, wherein the transmission wire set comprises a conductive wire, a signal wire, a plurality of conductive wires, and a plurality of signal wires or comprises at least one conductive wire and at least one signal wire.

15. The luminous pad with a light guide structure as claimed in claim 14, wherein the conductive wire is a twisted wire with an insulated outer layer.

16. The luminous pad with a light guide structure as claimed in claim 9, wherein the light pipe is a light pipe made of a Teflon material, and the light pipe comes with a color but still can transmit light.

17. A luminous pad with a light guide structure, coupled to a transmitter, and comprising:
   a pad body; and
   a light guide structure, configured to surround a periphery of the pad body, and further comprising:
      a light guide strip, fixed to the periphery of the pad body, and having a first position and a second position defined thereon, and the light guide strip comprising a light guide body and a light pipe wound around the light guide body;

a light source module, installed at the first position, and coupled to the transmitter;

an electric object, installed at the second position; and a transmission wire set, wound around the outer wall of the light pipe from the exterior of the light guide strip, and coupled and electrically conducted between the electric object and the transmitter.

18. The luminous pad with a light guide structure as claimed in claim 17, wherein the light guide strip is sewed securely to the periphery of the pad body by an overlock method.

19. The luminous pad with a light guide structure as claimed in claim 17, wherein the light pipe is a light pipe made of a Teflon material, and the light pipe comes with a color but still can transmit light.

\* \* \* \* \*